J. H. Whitenack.
Harvester Cutter.
No. 53069
Patented Mar. 6, 1866.
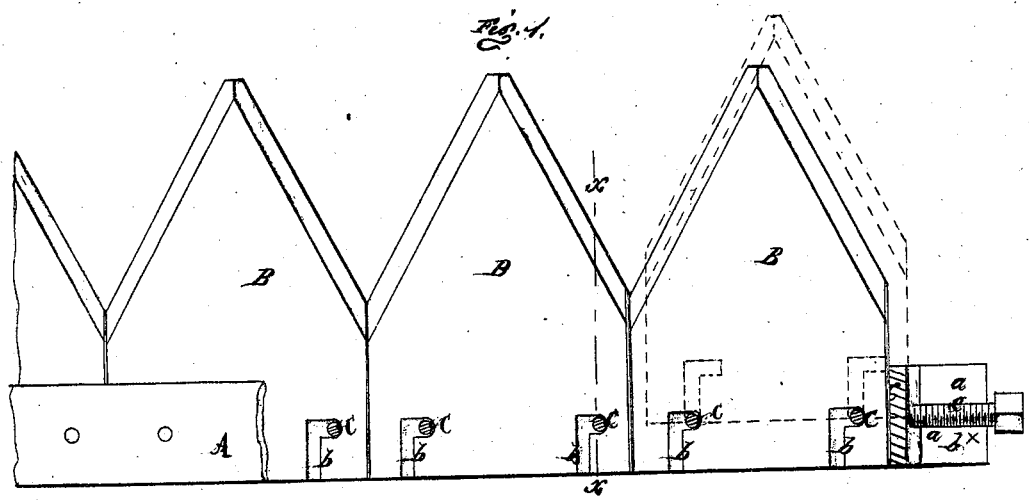
Witnesses.
Inventor.

UNITED STATES PATENT OFFICE.

J. H. WHITENACK, OF SOMERVILLE, NEW JERSEY.

IMPROVEMENT IN HARVESTERS.

Specification forming part of Letters Patent No. 53,069, dated March 6, 1866.

*To all whom it may concern:*

Be it known that I, J. H. WHITENACK, of Somerville, in the county of Somerset and State of New Jersey, have invented a new and Improved Mode of Attaching Teeth to the Sickle-Bars of Grain and Grass Harvesters; and I do hereby declare that the following is a full, clear, and exact description thereof, which will enable those skilled in the art to make and use the same, reference being had to the accompanying drawings, forming part of this specification, in which—

Figure 1 is a plan or top view of a sickle-bar, partly in section, and having teeth attached to it according to my invention; Fig. 2, a transverse section of the same, taken in the line $x\ x$, Fig. 1.

Similar letters of reference indicate corresponding parts.

This invention consists in attaching teeth to the sickle-bars of grain and grass harvesters in such a manner that they may be readily applied to the bars and detached from them, thereby greatly facilitating the grinding of the teeth and the keeping of them in proper working order, and also enabling the operator, in case of the breaking of a tooth, to remove the same and apply a new one in a very short space of time.

The sickle-bar I construct of two flat bars, A A, one being directly over the other, with plates $b^x$ inserted between them near their ends, through which plates and the bars A rivets or bolts $a$ pass, to secure the bars at a proper distance apart to admit of a space to receive the rear ends of the teeth B.

The teeth B are of the usual form, as shown clearly in Fig. 1, and each tooth is provided with two L-shaped slots, $b\ b$, (shown clearly in Fig. 1,) and the bars A A, having pins $c$ passing through them, which are in the front parts of the slots $b$ when the teeth are secured in position.

The teeth are secured in position by means of a set-screw, C, which passes through one of the end plates between the bars A A, and bears against an end tooth or against a key, $c$, between said tooth and the set-screw. This set-screw, it will be seen by referring to Fig. 1, causes the teeth to be kept closely together in contact, and the pins $c$ in the ends of the front parts of the slots $b$.

In order to remove one or any number of teeth, all that is required is simply to unscrew the screw C, so that the teeth B may be moved laterally and the pins $c$ brought in line with the portions of the slots $b$ which are parallel with each other and have a transverse direction relatively with the bars A A, when the teeth may be drawn out from between the bars A A, as indicated in red in Fig. 1.

Thus, by this simple arrangement, the teeth may be readily detached for the purpose of grinding, and a broken tooth removed and replaced by a new one with the greatest facility.

I claim as new and desire to secure by Letters Patent—

The described method of securing the teeth between the plates A A of the sickle-bar—namely, the L-shaped slots $b\ b$ in the teeth, the pins $c\ c$, and the tightening-screw C.

JOHN H. WHITENACK.

Witnesses:
H. M. GASTON,
JAMES BERGEN.